United States Patent [19]

Ohmori et al.

[11] Patent Number: 4,494,801
[45] Date of Patent: Jan. 22, 1985

[54] ANTILOCK BRAKE SYSTEM WITH SEPARATE FRONT- AND REAR-WHEEL SAFETY MEANS

[75] Inventors: Taiji Ohmori, Kawagoe; Makoto Sato, Kamifukuoka; Yoshikazu Tsuchiya, Fujimi, all of Japan

[73] Assignee: Honda Giken Kogyo Kabushiki Kaisha, Tokyo, Japan

[21] Appl. No.: 425,954

[22] Filed: Sep. 28, 1982

[30] Foreign Application Priority Data

Mar. 8, 1982 [JP] Japan ................... 57-36113
Mar. 8, 1982 [JP] Japan ................... 57-36114

[51] Int. Cl.³ ............................................. B60T 8/04
[52] U.S. Cl. .............................. 303/92; 303/20
[58] Field of Search ............... 303/20, 92, 94–97, 303/102, 103; 188/181 A, 181 C

[56] References Cited

U.S. PATENT DOCUMENTS 3,740,103  6/1973  Sweet et al. ............ 303/20 X

Primary Examiner—Duane A. Reger
Attorney, Agent, or Firm—Armstrong, Nikaido, Marmelstein & Kubovcik

[57] ABSTRACT

An antilock brake system with separate front- and rear-wheel safety means, in which front-wheel antilock control means and rear-wheel antilock control means are made so operative independently of each other that, when the front-wheel antilock control means for a front wheel generally having a larger proportion of the brake force distributed is troubled in its brake force suppressing state, front-wheel saftey means makes the function of the front-wheel antilock control means wholly ineffective to ensure the brake force to the front wheel whereas, when the rear-wheel antilock control means for a rear wheel generally having a smaller proportion of the brake force distributed is troubled in a state having lost its brake force suppressing function, rear-wheel safety means operates to effect that the brake force to the rear wheel is always stronger than that to the front-wheel thereby to maintain the steering stability of the wheeled vehicle.

3 Claims, 3 Drawing Figures

ANTILOCK BRAKE SYSTEM WITH SEPARATE FRONT- AND REAR-WHEEL SAFETY MEANS

BACKGROUND OF THE INVENTION

1. Field of the Invention

The present invention relates to an antilock brake system with separate front- and rear-wheel safety means, which system is equipped with independently operable front- and rear-wheel antilock control means so that it can always retain the brake force to the front wheel and maintain the steering stability of the wheeled vehicle even if either the front-wheel antilock control means or the rear-wheel antilock control means is troubled in its brake force suppressing state.

2. Description of the Prior Art

An antilock brake system is equipped with both brake force transmitting means for transmitting and applying the brake force to wheels and antilock control means for exerting such an action upon the brake force transmitting means as to suppress the brake force on the basis of predetermined controlling input factors when the brake force applied from that brake force transmitting means to the wheels is excessively strong. The antilock control means usually uses a fluid such as working oil as a control pressure transmitting medium, which is to be introduced through a pressure introduction valve into a control pressure chamber and released through a pressure release valve out of the control pressure chamber. The pressure introduction valve and the pressure release valve are respectively actuated by electromagnetic actuators, of which the electromagnetic actuator for the pressure introduction valve is made operative to open the pressure introduction valve, when energized, and to close it when deenergized whereas the electromagnetic actuator for the pressure release valve is made operative to close the pressure release valve, when actuated, and to open it when deenergized. As a result, when both the electromagnetic actuators for the pressure introduction and release valves are energized, the amount of the fluid in the control pressure chamber is continuously increased so that the brake force is reduced independently of the intention of a driver. On the other hand, when not the electromagnetic actuator for the pressure introduction valve but only the electromagnetic actuator for the pressure release valve is energized, the fluid in the control pressure chamber comes into its confined state so that the brake force is held at a constant level independently of the intention of the driver. Moreover, when both the electromagnetic actuators for the pressure introduction and release valves are deenergized, the fluid in the control pressure chamber is in its freely releasable state so that the brake force can be built up in accordance with the intention of the driver.

The respective electromagnetic actuators have their energizations controlled in accordance with the control output signals which are generated from antilock control circuits by conducting the arithmetic processings on the basis of predetermined control input factors such as the running speed of the vehicle, the accelerated or decelerated velocities of the wheels or the slip rates of the wheels.

It is generally customary to provide the antilock brake system with safety means for making the function of the antilock control means wholly ineffective, when the antilock control means is troubled, thereby to allow the antilock brake means to act as the normal brake means having no antilock control function.

Here, if all the antilock control functions to control the respective wheels of the vehicle are wholly or simultaneously made ineffective in accordance with the troubles of the antilock control means, the difference of the functions of the antilock brake system between the normal operation and the malfunction is enlarged to invite a fear that the driver feels anxious of that abrupt change in the performances. In the prior art, however, there is no suitable antilock brake system which has succeeded in solving that subject matter which can enjoy reliable operations and high utility although it has a simple construction.

SUMMARY OF THE INVENTION

It is, therefore, a major object of the present invention to provide an antilock brake system which is enabled to maintain the steering stability of a wheeled vehicle, while always retaining the brake forces necessary for the braking performance of the vehicle, even if antilock control means should be troubled.

Another object of the present invention is to provide an antilock brake system which is enabled to respectively and finely effect the safety treatments of front- or rear-wheel antilock control means if either is troubled.

A further object of the present invention is to provide an antilock brake system with separate front- and rear-wheel safety means, which system is enabled to enjoy reliable operations and high utility although it has a simple construction.

According to the present invention, there is provided an antilock brake system with separate front- and rear-wheel safety means, which system comprises: front- and rear-wheel antilock control means made operative independently of each other; front-wheel safety means for making the function of the front-wheel antilock control means wholly ineffective, when the front-wheel antilock control means is troubled in its brake force suppressing state, thereby to retain the brake force to be applied to the front wheel; and rear-wheel safety means for making the function of the front-wheel antilock control means ineffective to retain the directional stability when the rear-wheel antilock control means is troubled in a state having lost its brake force suppressing function, whereby the brake force to the front wheel having a larger proportion of the brake force distributed can always be retained to hold the braking performance of the vehicle and to maintain the steering stability of the vehicle.

According to the present invention, moreover, there is provided an antilock brake system with front- and rear-wheel safety means, which system comprises: front- and rear-wheel antilock control means made operative independently of each other; front-wheel safety means for making the function of the front-wheel antilock control means wholly ineffective, when the front-wheel antilock control means is troubled in its brake force suppressing state, thereby to retain the brake force to be applied to the front wheel; and rear-wheel safety means for suppressing the excessive brake force to be applied to the rear wheel, when the rear-wheel antilock control means is troubled in a state having lost its brake force suppressing function, in place of the rear-wheel antilock control means, whereby the brake force to the front wheel having a larger proportion of the brake force distributed can always be retained, while the suppressing function to suppress the excessive brake force to the rear wheel having a smaller proportion of the brake force distributed can be retained, thereby to maintain the steering stability of the vehicle.

The operations of the safety means of the present invention can be constructed of softwares such as an integrated circuit by the use of a microcomputer but can also be realized by the use of a hard logic circuit.

The above and other objects, features and advantages of the present invention will become apparent from the following detailed description of preferred embodiments when taken in conjunction with the accompanying drawings.

DESCRIPTION OF THE PREFERRED EMBODIMENTS

Figure 1:
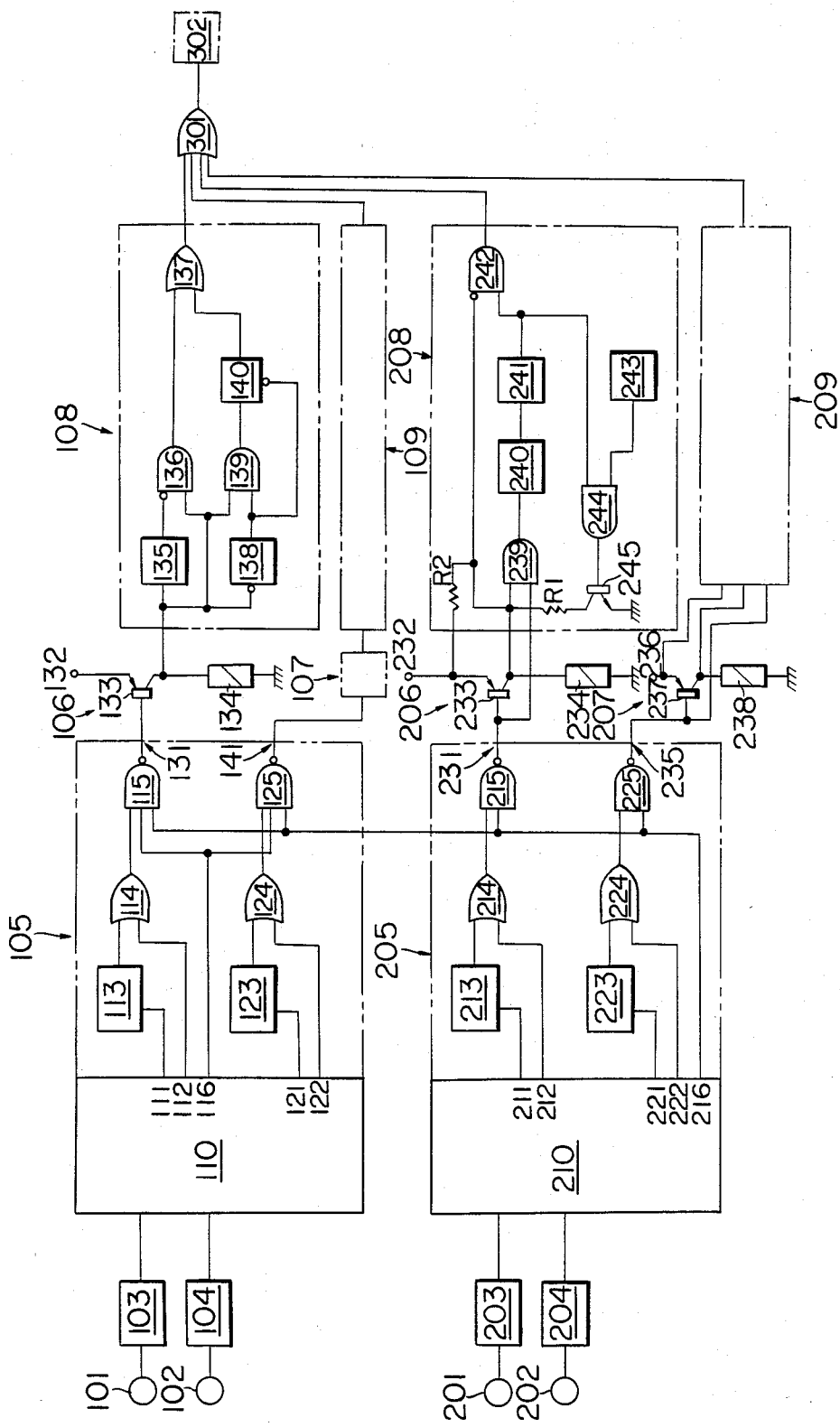
FIG. 1 is a block diagram showing an antilock brake system with separate front- and rear-wheel safety means in accordance with one preferred embodiment of the present invention.

As shown in FIG. 1, a righthand front-wheel speed detector 101 and a lefthand front-wheel speed detector 102 respectively detect the circumferential velocities of corresponding front wheels in the form of pulse signals and respectively feed their output signals to frequency-voltage converters 103 and 104. The output signals of the respective frequency-voltage converters 103 and 104 are respectively fed to a front-wheel antilock control circuit 105. This front-wheel antilock control circuit 105 conducts arithmetic processings and judgements in accordance with a variety of such control factors as will be described hereinafter and then feeds its antilock control output signals to a front-wheel pressure introduction valve actuator 106 and a front-wheel pressure release valve actuator 107. All of the front-wheel antilock control circuit 105, the front-wheel pressure introduction valve actuator 106 and the front-wheel pressure release valve actuator 107 coact with one another to constitute the front-wheel antilock control means of the present invention.

Next, the aforementioned front-wheel antilock control means will be described in more detail. In a pre-signal processor 110 of the front-wheel antilock control circuit 105, predetermined kinds of control factors such as the speed of the vehicle, the accelerated or decelerated velocities of the wheels or the slip rates of the wheels are calculated on the basis of the wheel velocity signals, which are generated from the wheel velocities of the righthand and lefthand front wheels, and judgements are conducted on the basis of those control factors in accordance with predetermined references therefor. After that, a pressure introduction valve interrupting signal is fed out of an output 111 whereas a pressure introduction valve continuing signal is fed out of an output 112. At this time, the pressure introduction valve interrupting signal fed out of the output 111 is a signal for gradually raising a control pressure by interruptedly and repeatedly opening and closing a pressure introduction valve. That signal is fed to an oscillator 113 only when the pressure introduction valve continuing signal is not fed out of the output 112. On the contrary, the pressure introduction continuing signal fed out of the output 112 is a signal for instantly raising the control pressure by continuously opening the pressure introduction valve. That signal is fed together with the output signal of the oscillator 113 to an OR circuit 114. And, the output signal of this OR circuit 114 is fed to an AND circuit 115.

From an output 116, on the other hand, there is generated a front-wheel vehicle-speed responding signal for raising the control pressure only when the vehicular velocity deduced on the basis of the circumferential velocities of the righthand and lefthand front wheels exceeds a predermined level. That front-wheel vehicle-speed responding signal is fed to both a pair of AND circuits 115 and 125.

Moreover, a pressure release valve interrupting signal is fed out of an output 121 whereas a pressure release valve continuing signal is fed out of an output 122. At this time, the pressure release valve interrupting signal fed out of the output 121 is a signal for gradually dropping the control pressure by interruptedly and repeatedly opening and closing a pressure release valve. That signal is fed to an oscillator 123 only when the pressure release valve continuing signal is not fed out of the output 122. On the contrary, the pressure release valve continuing signal fed out of the output 122 is a signal for blocking reduction in the control pressure by continuously closing the pressure release valve. That signal is fed together with the output signal of the oscillator 123 to an OR circuit 124. And, the output signal of this OR circuit 124 is fed to the AND circuit 125.

The paired AND circuits 115 and 125 are respectively made further receptive of the signal, which is fed out of the output 216 of a later-described rear-wheel antilock control circuit 205, i.e., the rear-wheel vehicle-velocity responding signal for raising the control pressure only when the vehicle velocity deduced on the basis of the circumferential velocities of the righthand and lefthand rear-wheels exceeds a predetermined level, as their input signal.

The output signal of the AND circuit 115 is inverted and is then fed through an output 131 of the front-wheel antilock control circuit 105 to the base of a power transistor 133 of the front-wheel pressure introduction valve actuator 106. That power transistor 133 has its emitter connected with a power source battery 132 and its collector connected with a front-wheel pressure introduction valve electromagnetic actuator 134.

On the other hand, the output signal of the AND circuit 125 is inverted and is then fed through an output 141 of the front-wheel antilock control circuit 105 to the base of a power transistor of the front-wheel pressure release valve actuator 107. The circuit construction of that front-wheel pressure release valve actuator 107 is basically identical to that of the front-wheel pressure introduction valve actuator 106 so that its illustration is omitted. Nevertheless, the power transistor of the front-wheel pressure release valve actuator 107 has its emitter connected with the power source battery 132 but has its collector connected with the front-wheel pressure release valve electromagnetic actuator.

A righthand rear-wheel speed detector 201 and a lefthand rear-wheel speed detector 202 respectively detect the circumferential velocities of corresponding rear wheels in the form of pulse signals and respectively feed their output signals to frequency-voltage converters 203 and 204. The output signals of the respective frequency-voltage converters 203 and 204 are respectively fed to the rear-wheel antilock control circuit 205. This rear-wheel antilock control circuit 205 conducts arithmetic processings and judgements similarly to the front-wheel antilock control circuit 105 in accordance with the various control factors and then feeds its antilock control output signals to a rear-wheel pressure introduction valve actuator 206 and a rear-wheel pressure release valve actuator 207. All of the rear-wheel antilock control circuit 205, the rear-wheel pressure introduction valve actuator 206 and the rear-wheel pressure release valve actuator 207 coact with one another to constitute the rear-wheel antilock control means of the present invention.

Next, the rear-wheel antilock control means will be described in more detail. In a pre-signal processor 210 of the rear-wheel antilock control circuit 205, predetermined kinds of control factors such as the speed of the vehicle, the accelerated or decelerated velocities of the wheels or the slip rates of the wheels are calculated on the basis of the wheel velocity signals, which are generated from the wheel velocities of the righthand and lefthand rear wheels, and judgements are conducted on the basis of those control factors in accordance with predetermined reference therefor. After that, a pressure introduction valve interrupting signal is fed out of an output 211 whereas a pressure introduction valve continuing signal is fed out of an output 212. At this time, the pressure introduction valve interrupting signal fed out of the output 211 is a signal for gradually raising a control pressure by interruptedly and repeatedly opening and closing a pressure introduction valve. That signal is fed to an oscillator 213 only when the pressure introduction valve continuing signal is not fed out of the output 212. On the contrary, the pressure introduction continuing signal fed out of the output 212 is a signal for instantly raising the control pressure by continuously opening the pressure introduction valve. That signal is fed together with the output signal of the oscillator 213 to an OR circuit 214. And, the output signal of this OR circuit 214 is fed to an AND circuit 215.

On the other hand, a pressure release valve interrupting signal is fed out of an output 221 whereas a pressure release valve continuing signal is fed out of an output 222. At this time, the pressure release valve interrupting signal fed out of the output 221 is a signal for gradually dropping the control pressure by interruptedly and repeatedly opening and closing a pressure release valve. That signal is fed to an oscillator 223 only when the pressure release valve continuing signal is not fed out of the output 222. On the contrary, the pressure release valve continuing signal fed out of the output 222 is a signal for blocking reduction in the control pressure by continuously closing the pressure release valve. That signal is fed together with the output signal of the oscillator 223 to an OR circuit 224. And, the output signal of this OR circuit 224 is fed to an AND circuit 225.

From an output 216, moreover, there is generated a rear-wheel vehicle speed responding signal for raising the control pressure only when the vehicular velocity deduced on the basis of the circumferential velocities of the righthand and lefthand rear wheels exceeds a predetermined level. That rear-wheel vehicle-speed responding signal is fed to both the paired AND circuits 115 and 125 of the front-wheel antilock control circuit 105 and the paired AND circuits 215 and 225 of the rear-wheel antilock control circuit 205.

The output signal of the AND circuit 215 is inverted and is then fed through an output 231 of the rear-wheel antilock control circuit 205 to the base of a power transistor 233 of the rear-wheel pressure introduction valve actuator 206. That power transistor 233 has its emitter connected with a power source battery 232 and its collector connected with a rear-wheel pressure introduction valve electromagnetic actuator 234.

On the other hand, the output signal of the AND circuit 225 is inverted and is then fed through an output 235 of the rear-wheel antilock control circuit 205 to the base of a power transistor 237 of the rear-wheel pressure release valve actuator 207. That power transistor 237 has its emitter connected with a power source battery 236 and its collector connected with a rear-wheel pressure release valve electromagnetic actuator 238.

Next, front-wheel safety means will be described. This front-wheel safety means is constructed of: a front-wheel pressure introduction valve trouble shooter 108 made operative in response to the output signal from the collector of the power transistor 133 of the front-wheel pressure introduction valve actuator 106 as its input signal; a front-wheel pressure release valve trouble shooter 109 made operative in response to the output signal from the collector of the power transistor of the front-wheel pressure release valve actuator 107 as its input signal; an OR circuit 301 made receptive of the output signals of both the front-wheel pressure introduction valve trouble shooter 108 and the front-wheel pressure release valve trouble shooter 109; and a safety holding relay 302 made operative, in response to the output signal of that OR circuit 301, to block the power supply battery 132, i.e., the power source for both the front-wheel pressure introduction valve actuator 106 and the front-wheel pressure release valve actuator 107 when it is judged that the front-wheel antilock control means is troubled in a state in which at least one of the front-wheel pressure introduction valve actuator 106 and the front-wheel pressure release valve actuator 107 continues to abnormally suppress the brake force.

The circuit construction of the front-wheel pressure release valve trouble shooter 109 is made basically identical to that of the front-wheel pressure introduction valve trouble shooter 108 so that its illustration is omitted. In the following, therefore, the front-wheel pressure introduction valve trouble shooter 108 will be described in more detail.

Simultaneously as the front-wheel pressure introduction valve electromagnetic actuator 134 is energized, a one-shot circuit 135 operates to invert its output signal and to feed it to an AND circuit 136. The output signal of the power transistor 133 is directly fed to the AND circuit 136. In response to the operation of the one-shot circuit 135, the AND circuit 136 does not generate its output signal, until a predetermined time has elapsed after the front-wheel pressure introduction valve electromagnetic actuator 134 is energized, but judges that the front-wheel antilock control means is troubled in its brake force suppressing state, when the power transistor 133 still continues to generate its output signal even after the predetermined time has elapsed, to feed the signal through an OR circuit 137 and the OR circuit 301 to the safety holding relay 302 thereby to block the power source battery 132.

The output signal of the power transistor 133 is further fed to a retrigger type one-shot circuit 138, while being in its inverted state, and directly to an AND circuit 139. That one-shot circuit 138 always generates its output signal, while the pulse interval of the output signal of the power transistor 133 is equal to or shorter than a predetermined level, so that the AND circuit 139 generates its output signal in accordance with the interruptions of the output signal of the power transistor 133 and feeds it to a counter circuit 140. This counter circuit 140 counts the number of the pulses of its input signal so that it judges that the front-wheel antilock control means is troubled in its brake force suppressing state, when the number of the pulses counted reaches a predetermined value, and feeds its signal through the OR circuit 137 and the OR circuit 301 to the safety holding relay 302 thereby to block the power source battery 132.

The output signal of that one-shot circuit 138 is inverted and fed to the counter circuit 140 thereby to hold the counter circuit 140 in its reset state. If the pulse interval of the output signal of the power transistor 133 exceeds the predetermined level until the number of the pulses counted by the counter circuit 140 reaches the predetermined value, the output signal of the one-shot circuit 138 is interrupted so that the counter circuit 140 is held in its reset state to generate no output signal thereby to continue the antilock control.

Next, the rear-wheel safety means will be described. This rear-wheel safety means is constructed of: a tear-wheel pressure introduction valve trouble shooter 208 for detecting the malfunction of the rear-wheel pressure introduction valve actuator 206; a rear-wheel pressure release valve trouble shooter 209 for detecting the malfunction of the rear-wheel pressure release valve actuator 207; an OR circuit 301 made receptive of the output signals of both the rear-wheel pressure introduction valve trouble shooter 208 and the rear-wheel pressure release valve trouble shooter 209; and a safety holding relay 302 made operative, in response to the output signal of that OR circuit 301, to block the power supply battery 132, i.e., the power source for both the rear-wheel pressure introduction valve actuator 206 and the rear-wheel pressure release valve actuator 207 when it is judged that the rear-wheel antilock control means is troubled in a state in which at least one of the rear-wheel pressure introduction valve actuator 206 and the rear-wheel pressure release valve actuator 207 has lost its brake force suppressing function. Incidentally, the OR circuit 301 and the safety holding relay 302 are shared with the front-sheel safety means.

The circuit construction of the rear-wheel pressure release valve trouble shooter 209 is made basically identical to that of the rear-wheel pressure introduction valve trouble shooter 208 so that its illustration is omitted. In the following, therefore, the rear-wheel pressure introduction valve trouble shooter 208 will be described in more detail.

The output singal of an AND circuit 239, which is made receptive of both the base and collector voltages of the power transistor 233 as its input signals, is fed to a delay circuit 240. When the output signal of the AND circuit 239 continues its high state longer than a predetermined time, the delay circuit 240 judges either that the power transistor 233 is short-circuited or that the rear-wheel pressure introduction valve electromagnetic actuator 234 is broken, and feeds its output signal to a one-shot circuit 241. This one-shot circuit 241 generates its output signal for a predetermined time when it receives the signal from the delay circuit 240.

When the one-shot circuit 241 generates its output signal, the output signal of an oscillator 243 is fed through an AND circuit 244 to the base of a transistor 245 thereby to interruptedly render the transistor 245 conductive. In case, at this time, the power transistor 233 is short-circuited, its collector voltage is inverted and fed to an AND circuit 242 so that this circuit 242 generates no output signal. In case, however, the rear-wheel pressure introduction valve electromagnetic actuator 234 is broken, the collector potential of the power transistor 233 is at its low level, when the output signal of the oscillator 243 is at its high level, by making the resistance of a resistor $R_1$ sufficiently lower than that of a resistor $R_2$. As a result, the AND circuit 242, which receives as its input signal the signal inverted from the output signal of the collector of the power transistor 233, judges that the rear-wheel antilock control means is troubled in a state having lost its brake force suppressing function, and feeds the output signal of the one-shot circuit 241 through the OR circuit 301 to the safety holding relay 302 thereby to block the power source for the front-wheel antilock control means, e.g., the power source battery 132.

Figure 2:
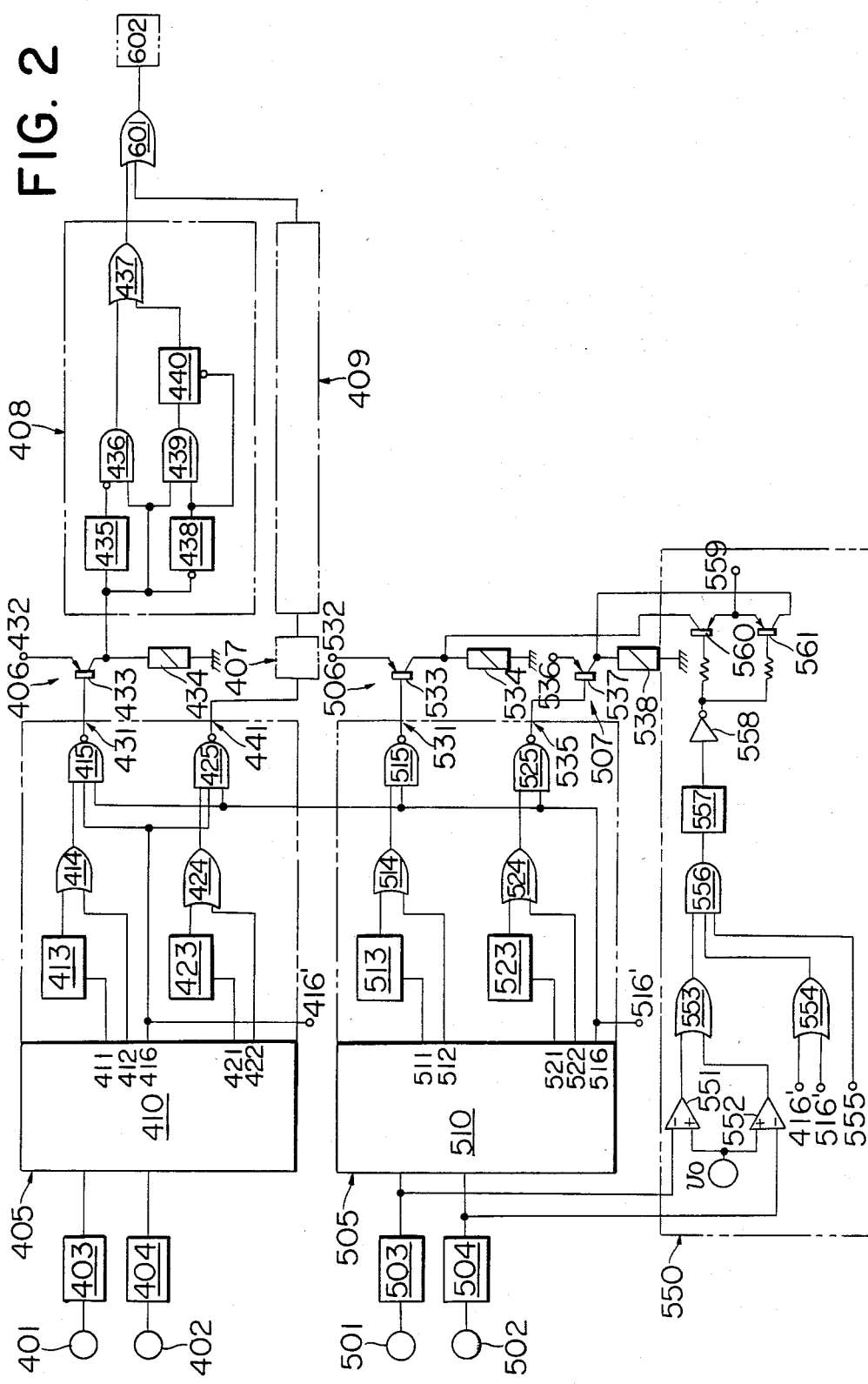
FIG. 2 is also a block diagram showing an antilock brake system with separate front- and rear-wheel safety means in accordance with another preferred embodiment of the present invention.

FIG. 2 is a block diagram showing a specific example according to another embodiment of the present invention. A righthand front-wheel speed detector 401 and a lefthand front-wheel speed detector 402 respectively detect the circumferential velocities of corresponding front wheels in the form of pulse signals and respectively feed their output signals to frequency-voltage converters 403 and 404. The output signals of the respective frequency-voltage converters 403 and 404 are respectively fed to a front-wheel antilock control circuit 405. This front-wheel antilock control circuit 405 conducts arithmetic processings and judgements in accordance with a variety of such control factors as will be described hereinafter and then feeds its antilock control output signals to a front-wheel pressure introduction valve actuator 406 and a front-wheel pressure release valve actuator 407. All of the front-wheel antilock control circuit 405, the front-wheel pressure introduction valve actuator 406 and the front-wheel pressure release valve actuator 407 coact with one another to constitute the front-wheel antilock control means of the present invention.

Next, the aforementioned front-wheel antilock control means will be described in more detail. In a pre-signal processor 410 of the front-wheel antilock control circuit 405, predetermined kinds of control factors such as the speed of the vehicle, the accelerated or decelerated velocities of the wheels or the slip rates of the wheels are calculated on the basis of the wheel velocity signals, which are generated from the wheel velocities of the righthand and lefthand front wheels, and judgements are conducted on the basis of those control factors in accordance with predetermined references therefor. After that, a pressure introduction valve interrupting signal is fed out of an output 411 whereas a pressure introduction valve continuing signal is fed out of an output 412. At this time, the pressure introduction valve interrupting signal fed out of the output 411 is a signal for gradually raising a control pressure by interruptedly and repeatedly opening and closing a pressure introduction valve. That signal is fed to an oscillator 413 only when the pressure introduction valve continuing signal is not fed out of the output 412. On the contrary, the pressure introduction continuing signal fed out of the output 412 is a signal for instantly raising the control pressure by continuously opening the pressure introduction valve. That signal is fed together with the output signal of the oscillator 413 to an OR circuit 414. And, the output signal of this OR circuit 414 is fed to an AND circuit 415.

From an output 416, on the other hand, there is generated a front-wheel vehicle-speed responding signal for raising the control pressure only when the vehicular velocity deduced on the basis of the circumferential velocities of the righthand and lefthand front wheels exceeds a predetermined level. That front-wheel vehicle-speed responding signal is fed to both a pair of AND circuits 415 and 425.

Moreover, a reference release valve interrupting signal is fed out of an output 421 whereas a pressure release valve continuing signal is fed out of an output 422. At this time, the pressure release valve interrupting signal fed out of the output 421 is a signal for gradually dropping the control pressure by interruptedly and repeatedly opening and closing a pressure release valve. That signal is fed to an oscillator only when the pressure release valve continuing signal is not fed out of the output 422. On the contrary, the pressure release valve continuing signal fed out of the output 422 is a signal for blocking reduction in the control pressure by continuously closing the pressure release valve. That signal is fed together with the output signal of the oscillator 423 to an OR circuit 424. And, the output signal of this OR circuit 424 is fed to the AND circuit 425.

The paired AND circuits 415 and 425 are respectively made further receptive of the signal, which is fed out of the output 516 of a later-described rear-wheel antilock control circuit 405, i.e., the rear-wheel vehicle-velocity responding signal for raising the control pressure only when the vehicle velocity deduced on the basis of the circumferential velocities of the righthand and lefthand rear-wheels exceeds a predetermined level, as thir input signal.

The output signal of the AND circuit 415 is inverted and is then fed through an output 431 of the front-wheel antilock control circuit 405 to the base of a power transistor 433 of the front-wheel pressure introduction valve actuator 406. That power transistor 433 has its emitter connected with a power source battery 432 and its collector connected with a front-wheel pressure introduction valve electromagnetic actuator 434.

On the other hand, the output signal of the AND circuit 425 is inverted and is then fed thrugh an output 441 of the front-wheel antilock control circuit 405 to the base of a power transistor of the front-wheel pressure release valve actuator 407. The circuit construction of that front-wheel pressure release valve actuator 407 is basically identical to that of the front-wheel pressure introduction valve actuator 406 so that its illustration is omitted. Nevertheless, the power transistor of the front-wheel pressure release valve actuator 407 has its emitter connted with the power source battery 432 but has its collector connected with the front-wheel pressure release valve electromagnetic actuator.

A righthand rear-wheel speed detector 501 and a lefthand rear-wheel speed detector 502 respectively detect the circumferential velocities of corresponding rear wheels in the form of pulse signals and respectively feed their output signals to frequency-voltage converters 503 and 504. The output signals of the respective frequency-voltage converters 503 and 504 are respectively fed to the rear-wheel antilock control circuit 505. This rear-wheel antilock control circuit 505 conducts arithmetic processings and judgements similarly to the front-wheel antilock control circuit 405 in accordance with the various control factors and then feeds its antilock control outpui signals to a rear-wheel pressure introduction valve actuator 506 and a rear-wheel pressure release valve actuator 507. All of the rear-wheel antilock control circuit 505, the rear-wheel pressure introduction valve actuator 506 and the rear-wheel pressure release valve actuator 507 coact with one another to constitute the rear-wheel antilock control means of the present invention.

Next, the rear-wheel antilock control means will be described in more detail. In a pre-signal processor 510 of the rear-wheel antilock control circuit 505, predetermined kinds of control factors such as the speed of the vehicle, the accelerated or decelerated velocities of the wheels or the slip rates of the wheels are calculated on the basis of the wheel velocity signals, which are generated from the wheel velocities of the righthand and lefthand rear wheels, and judgements are conducted on the basis of those control factors in accordance with predetermined reference therefor. After that, a pressure introduction valve interrupting signal is fed out of an outpui 511 whereas a pressure introduction valve continuing signal is fed out of an output 512. At this time, the pressure introduction valve interrupting signal fed out of the output 211 is a signal for gradually raising a control pressure by interruptedly and repeatedly opening and closing a pressure introduction valve. That signal is fed to an oscillator 513 only when pressure introduction valve continuing signal is not fed out of the output 512. On the contrary, the pressure introduction continuing signal fed out of the output 512 is a signal for instantly raising the control pressure by continuously opening the pressure introduction valve. That signal is fed together with the output signal of the oscillator 513 to an OR circuit 514. And, the output signal of this OR circuit 514 is fed to an AND circuit 515.

On the other hand, a pressure release valve interrupting signal is fed out of an output 521 whereas a pressure release valve continuing signal is fed out of an output 522. At this time, the pressure release valve interrupting signal fed out of the output 521 is a signal for gradually dropping the control pressure by interruptedly and repeatedly opening and closing a pressure release valve. That signal is fed to an oscillator 523 only when the pressure release valve continuing signal is not fed out of the output 522. On the contrary, the pressure release valve continuing signal fed out of the output 522 is a signal for blocking reduction in the control pressure by continuously closing the pressure release valve. That signal is fed together with the output signal of the oscillator 523 to an OR circuit 524. And, the output signal of this OR circuit 524 is fed to an AND circuit 525.

From an output 516, moreover, there is generated a rear-wheel vehicle speed responding signal for raising the control pressure only when the vehicular velocity deduced on the basis of the circumferential velocities of the righthand and lefthand rear wheels exceeds a predetermined level. That rear-wheel vehicle-speed responding signal is fed to both the paired AND circuits 415 and 425 of the front-wheel antilock control circuit 405 and the paired AND circuits 515 and 525 of the rear-wheel antilock control circuit 505.

The output signal of the AND circuit 15 is inverted and is then fed through an outpui 531 of the rear-wheel antilock control circuit 505 to the base of a power transistor 533 of the rear-wheel pressure introduction valve actuator 506. That power transistor 533 has its emitter connected with a power source battery 532 and its collector connected with a rear-wheel pressure introduction valve electromagnetic actuator 534.

On the other hand, the output signal of the AND circuit 525 is inverted and is then fed through an output 535 of the rear-wheel antilock control circuit 505 to the base of a power transistor 537 of the rear-wheel pressure release valve actuator 507. That power transistor 537 has its emitter connected with a power source battery 536 and its collector connected with a rear-wheel pressure release valve electromagnetic actuator 538.

Next, front-wheel safety means will be described. This front-wheel safety means is constructed of: a front-wheel pressure introduction valve trouble shooter 408 made operative in response to the output signal from the collector of the power transistor 433 of the front-wheel pressure introduction valve actuator 406 as its input signal; a front-wheel pressure release valve trouble shooter 409 made operative in response to the output signal from the collector of the power transistor of the front-wheel pressure release valve actuator 407 as its input signal; an OR circuit 501 made receptive of the output signals of both the front-wheel pressure introduction valve trouble shooter 408 and the front-wheel pressure release valve trouble shooter 409; and a safety holding relay 602 made operative, in response to the output signal of that OR circuit 601, to block the power supply battery 432, i.e., the power source for both the front-wheel pressure introduction valve actuator 406 and the front-wheel pressure release valve actuator 407 when it is judged that the front-wheel antilock control means is troubled in a state in which at least one of the front-wheel pressure introduction valve actuator 406 and the front-wheel pressure release valve actuator 407 continues to abnormally suppress the brake force.

The circuit construction of the front-wheel pressure release valve trouble shooter 409 is made basically identical to that of the front-wheel pressure introduction valve trouble shooter 408 so that its illustration is omitted. In the following, therefore, the front-wheel pressure introduction valve trouble shooter 408 will be described in more detail.

Simultaneously as the front-wheel pressure introduction valve electromagnetic actuator 434 is energized, a one-shot circuit 435 operates to invert its output signal and to feed it to an AND circuit 436. The output signal of the power transistor 433 is directly fed to the AND circuit 436. In response to the operation of the one-shot circuit 435, the AND circuit 436 does not generate its output signal, until a predetermined time has elapsed after the front-wheel pressure introduction valve electromagnetic actuator 434 is energized, but judges that the front-wheel antilock control means is troubled in its brake force suppressing state, when the power transistor 433 still continues to generate its output signal even after the predetermined time has elapsed, to feed the signal through an OR circuit 437 and the OR circuit 601 to the safety holding relay 602 thereby to block the power source battery 432.

The output signal of the power transistor 433 is further fed to a retrigger type one-shot circuit 438, while being in its inverted state, and directly to an AND circuit 439. That one-shot circuit 438 always generates its output signal, while the pulse interval of the output signal of the power transistor 433 is equal to or shorter than a predetermined level, so that the AND circuit 439 generates its output signal in accordance with the interruptions of the output signal of the power transistor 433 and feeds it to a counter circuit 440. This counter circuit 440 counts the number of the pulses of its input signal so that it judges that the front-wheel antilock control means is troubled in its brake force suppressing state, when the number of the pulses counted reaches a predetermined value, and feeds its signal through the OR circuit 437 and the OR circuit 601 to the safety holding relay 602 thereby to block the power source battery 432.

The output signal of that one-shot circuit 438 is inverted and fed to the counter circuit 440 thereby to hold the counter circuit 440 it its reset state. If the pulse interval of the output signal of the power transistor 433 exceeds the predetermined level until the number of the pulses counted by the counter circuit 440 reaches the predetermined value, the output signal of the one-shot circuit 438 is interrupted so that the counter circuit 440 is held in its reset state to generate no output signal thereby to continue the antilock control.

Next, rear-wheel safety means 550 will be described. The output signals of the respective frequency-voltage converters 503 and 504 are respectively fed to corresponding compactors 551 and 552. Here, when the input signals of the respective comparators 551 and 552 are lower than a predetermined level $v_0$, the corresponding comparators 551 and 552 feed their respective output signals through an OR circuit 553 to an AND circuit 556. On the other hand, when the vehicular velocity deduced on the basis of the circumferential velocities of the front wheels is equal to or higher than a predetermined level, the signal is fed from the output 416 of the front-wheel antilock control circuit 405 to a terminal 416. Moreover, when the vehicular velocity deduced on the basis of the circumferential velocities of the rear wheels is equal to or higher than a predetermined level, the signal is fed from the output 516 of the rear-wheel antilock control circuit 505 to a terminal 516'. The signals thus fed to the respective terminals 416' and 516' are respectively fed through an OR circuit 554 to the AND circuit 556. Moreover, when the driver starts his braking operation, a signal is fed to a terminal 555 and further to the AND circuit 556.

As a result, if at least one of the righthand and lefthand rear wheels has its circumferential velocity failing to exceed a reference velocity when the braking operation is conducted in case the vehicular speed exceeds a predetermined level, the AND circuit 556 judges that the rear wheels has come into their locked states, and feeds its output signal to a one-shot circuit 557. This one-shot circuit 557 generates its output signal for a predetermined time if it receives the signal from the AND circuit 556. The output signal of the one-shot circuit 557 is inverted by an inverter 558 and is fed to the bases of a pair of transistors 560 and 561. These respective transistors 560 and 561 have their emitters connected with a power source battery 559, but the transistor 560 has its collector connected with the rear-wheel pressure introduction valve electromagnetic actuator 534 whereas the transistor 561 has its collector connected with the rear-wheel pressure release valve electromagnetic actuator 538.

Figure 3:
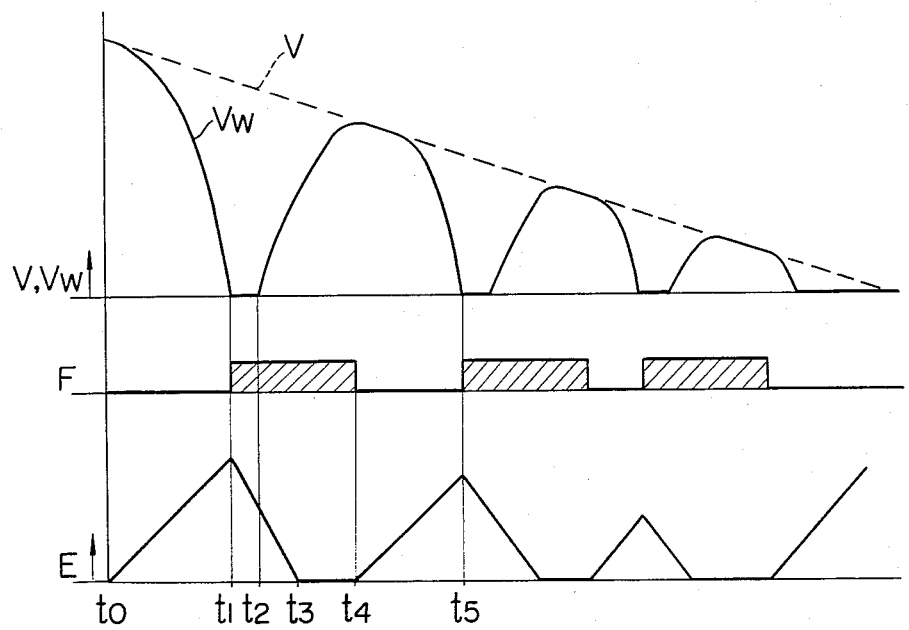
FIG. 3 is a time diagram for explaining the changes of one example of the operations of the rear-wheel safety means of FIG. 2.

FIG. 3 illustrates an example of the correlations between the time lapse and the magnitude E of the brake force for the rear wheels, a brake force suppressing signal F for energizing the respective electromagnetic actuators 534 and 538, the circumferential velocities $V_W$ of the rear wheels, and the vehicular speed V when the rear-wheel safety means 550 of FIG. 2 is operated. If the braking operation is started at time $t_0$, the circumferential velocities $V_W$ of the rear wheels are dropped in accordance with increase in the magnitude E of the brake force. At time $t_1$, the rear wheels come into their locked states, but the brake force suppressing signal F is instantly generated to suppress the brake force. As the magnitude E of the brake force is dropped, the rear wheels are released at time $t_2$ from their locked states to restore their circumferential velocities $V_W$. At time $t_3$, the brake force disappears. However, when a preset time elapses after the time $t_1$ to reach time $t_4$, the brake force suppressing signal F disappears so that the brake force is restored again to have its magnitude continuously increased. In accordance with this, however, the circumferential velocities $V_W$ of the rear wheels are again dropped until the rear wheels come again into their locked states at time $t_5$. As a result, the brake force suppressing signal F is instantly generated. The vehicle speed V is subsequently dropped in a gradual manner while similar cycles being successively repeated.

What is claimed is:

1. An antilock brake system with separate front- and rear-wheel safety means, comprising:
a brake force applying system for applying a brake force to front and rear wheels; front-wheel antilock control means for suppressing the brake force applied to said front wheel when the brake force to said front wheel is excessively strong; rear-wheel antilock control means for suppressing the brake force applied to said rear wheel when the brake force to said rear wheel is excessively strong; front-wheel safety means for detecting a malfunction, when said front-wheel antilock control means is malfunctioning in its brake force suppressing state, to instantly block the supply of power to said front-wheel antilock control means; and rear-wheel safety means for suppressing the brake force to said rear wheel each time the brake force to said rear wheel is excessively strong, when said rear-wheel antilock control means has a malfunction and has lost its brake force suppressing function.

2. An antilock brake system as set forth in claim 1, wherein said rear-wheel safety means suppresses the brake force to said rear wheel only for a predetermined time each time the brake force to said rear wheel is excessively strong.

3. An antilock brake system as set forth in claim 1, wherein said rear wheel safety means is independent of said front wheel safety means.

* * * * *